US009796614B1

(12) United States Patent
Atkinson et al.

(10) Patent No.: US 9,796,614 B1
(45) Date of Patent: Oct. 24, 2017

(54) BOW PUMP AND REACTOR FOR WASTEWATER TREATMENT

(71) Applicants: Michael Austin Atkinson, Rolla, MO (US); Timothy Harrison Canter, Ashland, MO (US)

(72) Inventors: Michael Austin Atkinson, Rolla, MO (US); Timothy Harrison Canter, Ashland, MO (US)

( * ) Notice: Subject to any disclaimer, the term of this patent is extended or adjusted under 35 U.S.C. 154(b) by 0 days.

(21) Appl. No.: 14/622,590

(22) Filed: Feb. 13, 2015

(51) Int. Cl.
*C02F 11/00* (2006.01)

(52) U.S. Cl.
CPC ..................... *C02F 11/00* (2013.01)

(58) Field of Classification Search
CPC ....................................... C02F 11/00
See application file for complete search history.

(56) References Cited

U.S. PATENT DOCUMENTS

| | | | | |
|---|---|---|---|---|
| 1,139,024 A * | 5/1915 | Frank | ........................ | C02F 3/12 209/164 |
| 2,987,186 A * | 6/1961 | Burgoon | ................... | C02F 3/12 210/197 |
| 3,842,804 A * | 10/1974 | Christensen | ........... | A01K 61/00 119/227 |
| 3,967,393 A * | 7/1976 | Nixon | ....................... | E02F 3/88 210/170.04 |
| 4,390,422 A * | 6/1983 | Mackrle | .................... | C02F 3/12 210/188 |
| 5,316,682 A * | 5/1994 | Keyser | .................. | B01F 5/0476 210/195.2 |
| 5,569,376 A * | 10/1996 | Graves | ............... | B01D 21/0003 210/195.4 |
| 5,620,602 A * | 4/1997 | Stuth | ........................ | C02F 3/04 210/151 |
| 6,787,035 B2 | 9/2004 | Wang | | |
| 2013/0105408 A1* | 5/2013 | Bradley | ............. | B01F 3/04609 210/758 |
| 2013/0153494 A1 | 6/2013 | Wang | | |
| 2014/0158614 A1 | 6/2014 | Wang | | |

* cited by examiner

*Primary Examiner* — Chester Barry

(57) ABSTRACT

Described herein is a device for the treatment of water and wastewater that provides a biological or chemical reactor a means to enhance performance by initiating a unique flow pattern between the reactive and solids/liquid separation zones. Said device circulates water between the two zones by forcibly directing water that enters the settling zone back toward the reaction zone via an opening in a partition. The fluid motion scours the bottom of the settling chamber to prevent the accumulation of biologically active solids while maximizing the time those solids spend in the reaction zone; thereby increasing the treatment efficiency of the overall process.

31 Claims, 4 Drawing Sheets

BOW PUMP AND REACTOR FOR WASTEWATER TREATMENT

BACKGROUND

Prior Art

The following is a tabulation of some prior art that presently appears relevant:

| U.S. Patents | | | |
|---|---|---|---|
| U.S. Pat. No. | Kind Code | Issue Date | Patentee |
| 6,787,035 | B2 | 2004 Sep. 7 | Wang |
| U.S. patent application Publications | | | |
| Publication Nr. | Kind Code | Issue Date | Patentee |
| 20140158614 | A1 | 2014 Jun. 12 | Wang |
| 20130153494 | A1 | 2013 Jun. 20 | Wang, Canter |

Nonpatent Literature Documents

Metcalf and Eddy, *Wastewater Engineering: Treatment and Reuse*, McGraw-Hill, Inc., 4th Edition, Boston, Mass., USA (2003)

The suspended-growth activated sludge treatment process is one of the most widely used biological processes for removing organic waste in water. The conventional activated sludge process fundamentally comprises a means to culture biomass that consumes organic waste (generally under aerobic conditions) and a means to separate said biomass from the discharge stream. The biomass removed from the effluent stream is returned or retained to the culturing process. The organic removal process, while normally aerobic, may feature a number of electron acceptors other than oxygen that result in anoxic (nitrate or nitrite present) or anaerobic conditions.

In most cases the wastewater contains organic nitrogen, ammonia, and phosphorus, constituents that are broadly known as nutrients. Nutrients can increase algal growth in a body of water, and high concentrations of algae can deplete the oxygen available for fish and other aquatic organisms. Nitrogen can be thoroughly removed in the bioreactor. Through a process of nitrification and denitrification. Phosphorous is removed to some degree by the natural uptake of organic phosphorous by cellular organisms and by discarding organic and inorganic particulates with waste sludge.

Nitrification and denitrification can be achieved by implementing several variations of hydraulic flow, but fundamentally there must be aerobic and anoxic conditions present within the reactor. Three very common hydraulic process flow types are: (a) use of a pre-anoxic zone and aerobic zone, (b) a reaction zone where the DO is maintained at a threshold such as to allow concurrent nitrification and denitrification to occur within bacterial flocs, and (c) alternating between aerobic and alternating conditions within a reactor.

The pre-anoxic option is perhaps the most conventional approach, and is best represented by the Modified Ludzack-Ettinger (MLE) Process. This process relies on liquid containing nitrate and nitrite to be returned form the aerobic zone to the pre-anoxic zone for nitrate/nitrite removal. Limitations on denitrification become the amount of fluid returned and the availability of organic carbon in the influent. Organic carbon may be added as a supplement, but this can drastically increases cost and complexity.

Metcalf and Eddy discusses a conventional MLE Process for total nitrogen removal. It has an anoxic zone for denitrification followed by an aerobic zone for BOD degradation and nitrification.

Mixed liquor in the aerobic zone is forcibly returned to the anoxic zone to provide nitrate. The effluent from the aerobic zone flows through a secondary clarifier for solids-liquid separation, and settled sludge in the secondary clarifier is returned to the anoxic zone to provide appropriate amount of biomass needed for biological functions. Supernatant in the secondary clarifier is discharged. The anoxic zone is continuously mixed, mostly through mechanical mixing devices. Downfalls of this design are the extraordinary equipment requirements, large footprint, process complexity, energy requirements, and the necessity of attention to support the functions of the process.

U.S. Pat. No. 6,787,035 B2 discusses a reactor that has been designed with an internal settling device to automatically return sludge to the aerobic zone.

This system uses an aerobic zone (18) for BOD removal and nitrification, and returns a portion of the liquor to a pre-anoxic zone (16) for denitrification. Supplemental sludge is returned from final clarifier (36) back to the bioreactor through a sludge return device (38). During normal operation, influent is continuously fed to the bioreactor and the aeration device (22) is continuously operated to charge oxygen to the bioreactor.

This configuration is capable of high levels of treatment and is less expensive that the conventional pre-anoxic system. However, return of the settled sludge from the internal settling device is fully dependent on the settling characteristics of the sludge, ability of the aeration device (22) to create a convective vacuum, and the liquid level difference between the middle and right-hand chambers.

U.S. Patent Applications US20130153494 A1 and US20140158614 A1 represent one an improvement on the previous embodiment. The fluid flows from an aerobic or aerobic/anoxic zone (52) to a static zone (54). The static zone (54) is either open or closed at the bottom, and a return pump may be employed to help transfer solids from the static zone (54) to either the aerobic zone (52) or the anoxic zone (50). There are several iterations of this that include multiple zones, but the core principle is the same.

One challenge with this design we foresee is the tendency for sludge to accumulate in the static zone (54). If the partition between the aerobic zone (52) and static zone (54) is open, then a convective force from aeration draws solids back to the aerobic zone. This force is relatively weak and solids that are (a) large or (b) settle a significant distance from the partition (60) will not be affected. If the partition is closed then a pump (64) is relied upon to convey solids. This mode of operation can be challenging because the intake of the pump is rather limited in size. Solids can settle around the opening and not be affected. If the two methods are combined the interference or the pump with the opening of the partition (60) can limit the effectiveness of the convective vacuum.

FIG. 3 also shows an apparatus to provide large bubble mixing (58). This apparatus uses a type of siphon effect to pull air that has accumulated in the outer ring into the inner tube once the air level reaches the port on the side of the tube. A tube is used to suck settled solids from around the mixer and distribute them along the surface of the fluid, as opposed to releasing a large bubble directly into the bulk fluid. One challenge we identified with this design is the potential for clogging. Fibrous material such as rags, hair, etc. is common in municipal wastewater treatment plants. This type of material, once deposited in the inner workings of the siphon pump, can lead to reduced, performance and clogging

SUMMARY

One crucial aspect of wastewater treatment is the separation of water and microbes (i.e., solids) before water is discharged from the reactor (i.e., the effluent). The quality of the effluent is judged by several parameters that include total suspended solids (TSS), which is a direct measurement of the mass of solids per volume of liquid. The solids that are in treatment plant effluent are typically organic in nature and, therefore, their presence affects other measurements of quality including Biological Oxygen Demand (BOD), Total Nitrogen, and Total Phosphorous. The efficient and effective removal of solids is paramount to overall treatment quality. On occasion a facility will have additional treatment steps that occur after the primary biological process. Such steps may include additional filtration (e.g., sand filters, cloths filters, etc.) or chemical addition for disinfection, as well as several others. Decreasing the solids concentration that is applied to these downstream treatment steps can decrease the size requirements of equipment and/or prolong equipment life.

Low TSS in the effluent is not the sole purpose for solids separation for many types of biological treatment processes. Solids that are removed from the effluent are either retained in the basin or transported to different zones within the process for specific purposes. A higher TSS removal in a reactor can lead to great the overall solids concentration, or Mixed Liquor Suspended Solids (MLSS), in the process. Processes with high MLSS concentrations are able to treat incoming wastewater more quickly and/or using a smaller treatment basin. Furthermore, a higher MLSS allows a system to be more resistant to any biocides or toxins that may enter the treatment process. Sometimes the sludge ("sludge" being a term for liquid with a very high concentration of solids) is returned from the clarification system (i.e., the equipment providing liquid/solid separation) to specific zones in the treatment process. The Return Activated Sludge (RAS) can be place in zones where specific electron acceptors are selected to allow for desired biological processes. For example, an "anoxic zone" is characterized by a lack of oxygen (generally the preferred electron acceptor) but where nitrate and/or nitrite (both components of Total Nitrogen) is present. Some bacteria will use nitrate/nitrite when no oxygen is available and, by doing so, convert the nitrate/nitrite to nitrogen gas. Similarly, exposing some organisms to anaerobic (no oxygen or nitrate/nitrite) can cause abnormal accumulation of phosphorous in some bacteria and allow for high levels of phosphorous removal. A high MLSS concentration can help maintain the environmental conditions in these zones by limits the effects from carryover of oxygen and/or nitrate/nitrite from preceding zones.

The present invention provides a means to efficiently and effectively separate solids from liquid. By immediately returning solids to the reaction zone the device increases the overall treatment efficiency of the reactor by keeping bacteria in a location where they provide treatment, rather than in a large settling device or return piping. The device also incorporates a recirculatory effect whereby a significant portion of the fluid that is returned back to the reaction zone reenters the settling zone. The result is a fluid pattern that improves flocculation and overall treatment. If desired, the solids can be returned, just as they reenter the reaction zone, back to preceding zones for anoxic or anaerobic contact.

The present invention can be incorporated into new or existing treatment systems. A number of embodiments are possible that comprise one or more reaction zones, anoxic/anaerobic zones, and other equipment necessary for complete wastewater treatment. Existing treatment systems can be made to accept the present invention for increased performance and/or decreased operating costs/complexity. One example, among several potential embodiments, is the incorporation of the present invention into an existing clarifier (i.e., a liquid/solids separation system).

BRIEF DESCRIPTION OF THE DRAWINGS

FIG. 100 is a side view of the first embodiment.
FIG. 200 is side view of the second embodiment.
FIG. 300 is an overhead view of the second embodiment.
FIG. 400 is a flow diagram that illustrates the water flow pattern of the first and second embodiments.

DRAWINGS

Reference Numerals

Figure 1:
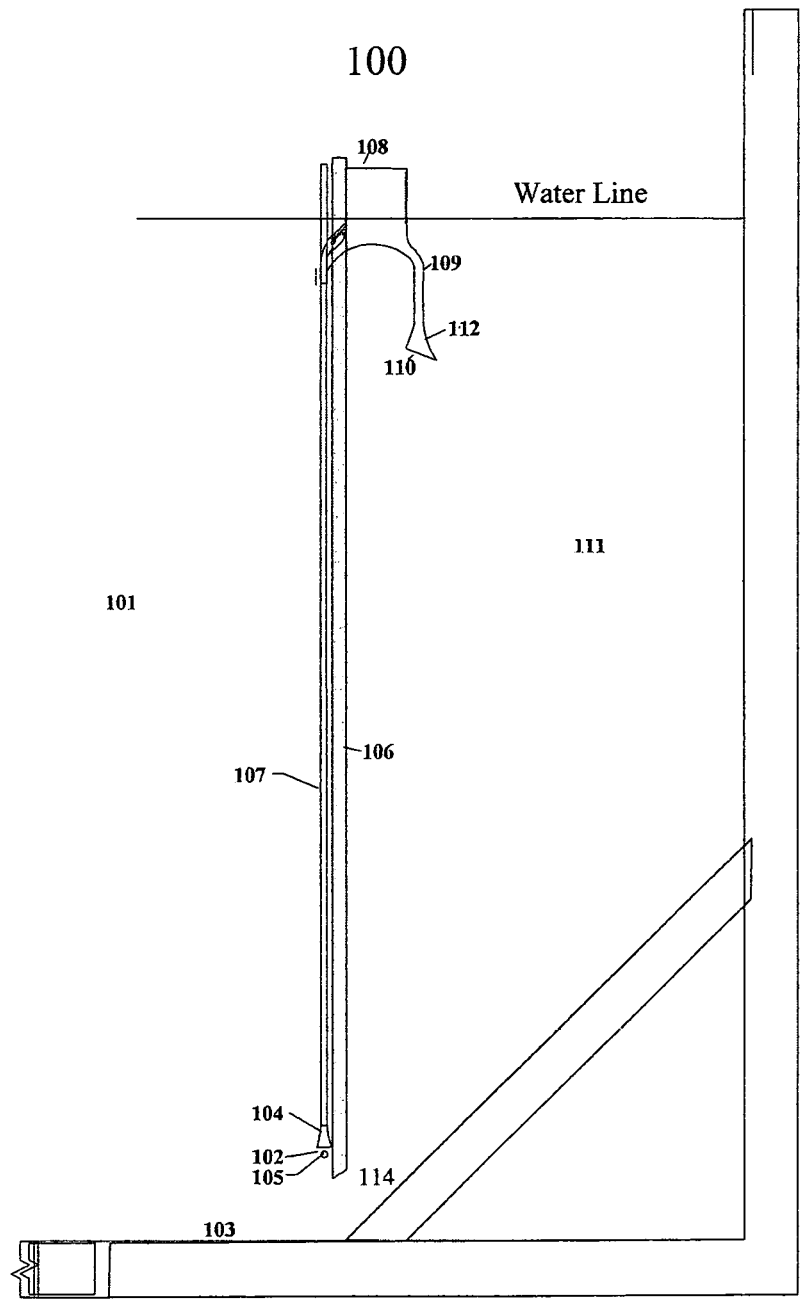
Figure 2:
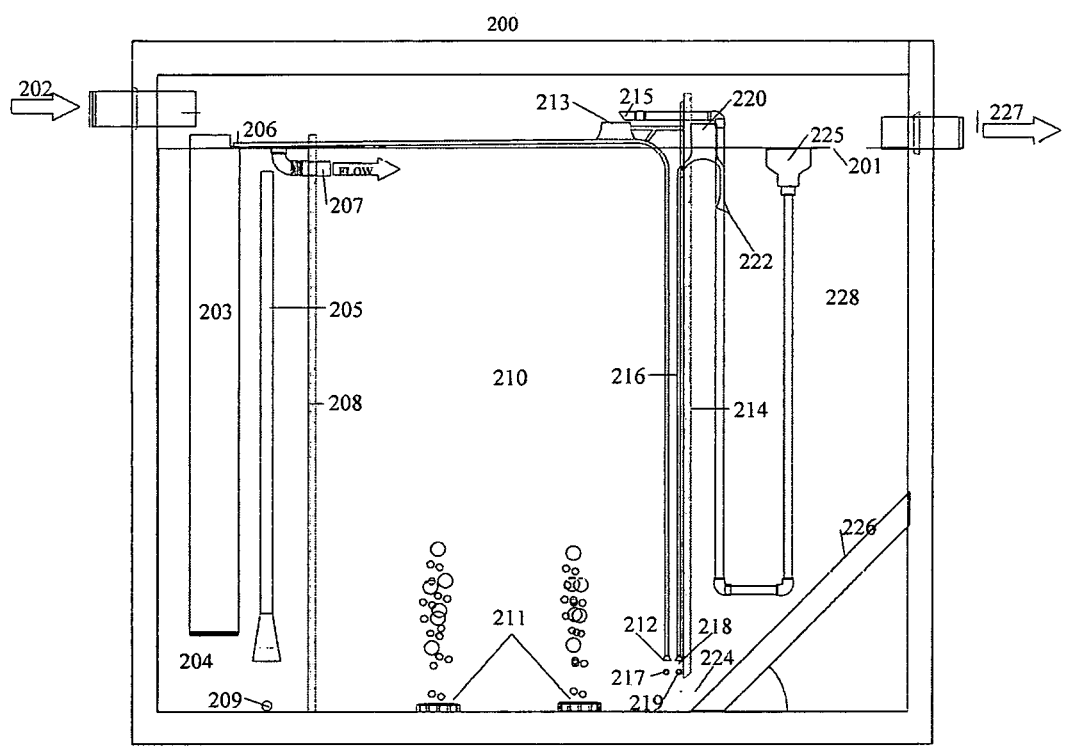
Figure 3:
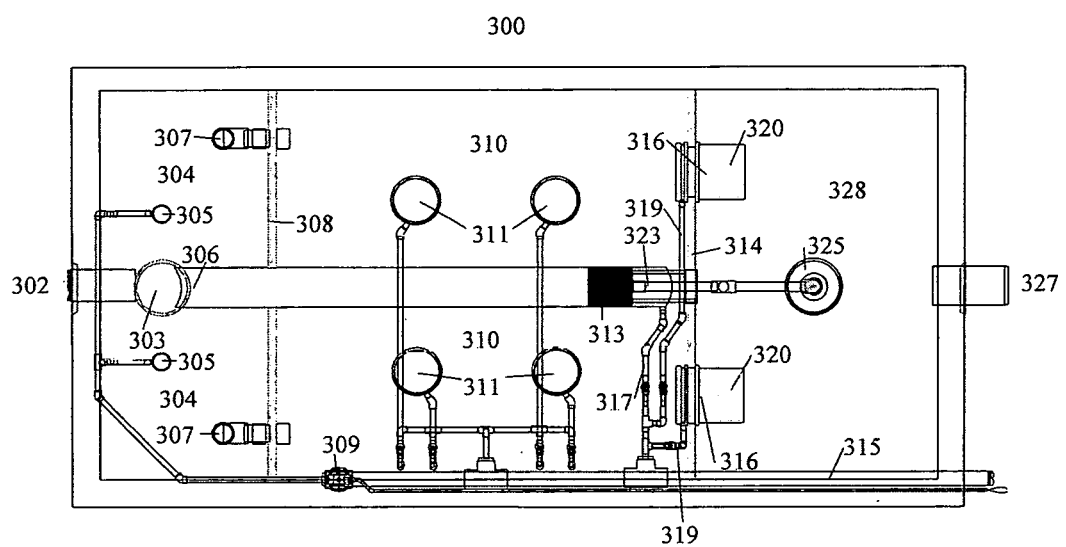
Figure 4:
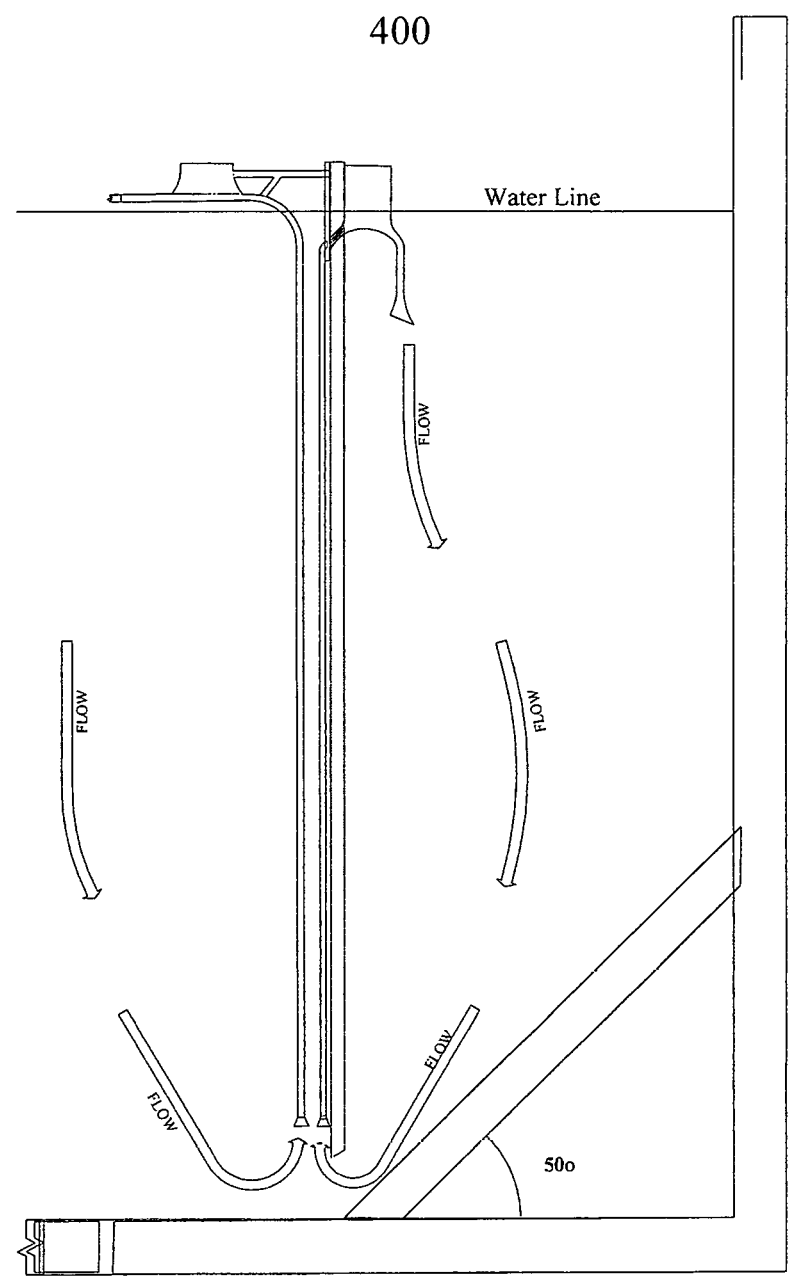

FIG. 100
101. Zone 1
102. Inlet of Flow Inducing Mechanism
103. Bottom of the Tank
104. Converging Port
105. Air Injection Point
106. Partition between Zone 1 and Zone 2
107. Neck of Flow Inducing Mechanism
108. Air Release Point
109. Trunk of Flow Inducing Mechanism
110. Discharge point of Flow Inducing Mechanism
111. Zone 2
112. Diverging Port
114. Partition Opening
FIG. 200
201. Water Line
202. Inlet
203. Contact Chamber
204. Anoxic/Anaerobic Reaction Zone
205. Mixer(s)
206. Outlet of Internal Recycle
207. Anoxic/Anaerobic Discharge Port
208. Partition Separating Reaction Zones
209. Air Supply for Mixing Device
210. Aerobic Reaction Zone
211. Fine-Bubble Diffusers
212. Intake of Internal Recycle Line
213. Air Release Point of Mechanism(s) Providing Internal Recycle
214. Partition Separating Aerobic Reaction Zone from Static Zone
215. Outlet of Scum Removal Device
216. Mechanism(s) Providing Flow from Reaction Zone to Static Zone
217. Air Supply for Internal Recycle
218. Inlet of Mechanism(s) Providing Flow from Reaction Zone to Static Zone
219. Air Supply for Mechanism(s) Providing Flow from Reaction Zone to Static Zone
220. Air Release Point of Mechanism(s) Providing Flow from Reaction Zone to Static Zone 222. Outlet of Mechanism(s) Providing Flow from Reaction Zone to Static Zone
224. Opening(s) in Partition Separating Aerobic Reaction Zone from Static Zone
225. Scum Removal Device
226. Sloped Floor of Static Zone
227. Outlet
228. Static Zone
FIG. 300
302. Inlet
303. Contact Chamber
304. Anoxic/Anaerobic Reaction Zone
305. Mixer(s)
306. Outlet of Internal Recycle
307. Anoxic/Anaerobic Discharge Port
308. Partition Separating Reaction Zones
309. Solenoid Valve to Control Mixing Pump(s)
310. Aerobic Reaction Zone
311. Fine-Bubble Diffusers
313. Air Release Point of Mechanism(s) Providing Solids Return
314. Partition Separating Aerobic Reaction Zone from Static Zone
315. Air Supply Manifold
316. Mechanism(s) Providing Flow from Reaction Zone to Static Zone
317. Air Supply for Internal Recycle
319. Air Supply for Mechanism(s) Providing Flow from Reaction Zone to Static Zone
320. Air Release Point of Mechanism(s) Providing Flow from Reaction Zone to Static Zone
323. Outlet of Scum Removal Device
325. Scum Removal Device
327. Outlet
328. Static Zone
FIG. 400

DETAILED DESCRIPTION

First Embodiment

FIG. 1

The first general embodiment is represented in FIG. 100. The device may be made from any number of materials, but most likely will be aluminum, stainless steel, or plastic. In this general embodiment the device is seen as being rectangular in shape, but the embodiment may be formed into several different shapes (e.g., oval, circular, etc.) depending on the application and surrounding structure.

The Inlet 102 or the first embodiment consists of a Converging Port 104. The Converging Port may be designed to allow the uptake of liquid from an area wider than the rest of the device. This general embodiment shows the Converging Port positioned close to the Partition Opening 114 and angled toward said opening. Space is left between the Bottom of the Tank 103 and the Converging Port to allow some fluid transfer back to Zone 1 101. An Air Injection Point 105 is generally located directly below the Converging Port. Two things should be noted; (a) that the Air Injection Point could be attached to, or located in, the device and (b) the device could be operated using any means to convey fluid and not necessarily an air lift type of pump.

The Inlet is connected to a Neck 107 of the device that continues to the Partition between Zone 1 and Zone 2 106. The Trunk 109 of the device stretches from the Partition into Zone 2 111. An Air Release Point 108 is shown in this embodiment as being on the Trunk in Zone 2. It should be noted that the Air Release Point may be located on either the Neck or the Trunk, and may be at, above, or below the liquid level of Zone 1 and/or Zone 2. At the bottom of the Trunk is a Discharge Point 110 that includes, on this embodiment, a Diverging Port 112. At the bottom of the Partition there is a Partition Opening 114.

Operation

FIG. 100

Liquid enters the device through the inlet 102 via the Converging Port 104. The Converging Port may be designed wider than the rest of the device to allow maximum uptake of liquid from the Partition Opening 114 to create recirculation. An Air Injection Point 105 is shown in this embodiment as being directly below the Converging Port. Continuous or intermittent airflow enters the device the density of the fluid in the device becomes less than the density in the surrounding fluid, thereby creating flow through the device.

Fluid and, in this embodiment, air travel up the Neck 107 of the device and across the Partition between Zone 1 and Zone 2 106. Air leaves the fluid and device at the Air Release Point 108, 208, 308, 408, 508, and the fluid then travels down the Trunk 109 of the device. The Truck is designed to minimize head loss and positioned to direct fluid flow out of the Discharge Point 110, through a Diverging Port 112, and toward the Partition Opening 114. Flow direction in the embodiment may be designed to push solids from Zone 2 and into Zone 1 while creating the Recirculation Effect.

FIGS. 200-400

Alternative Embodiments

An alternate embodiment of the disclosed invention is a suspended-growth bioreactor and method comprising of two reaction zones and one static zone, and is illustrated in a side and overhead view in FIG. 200 and FIG. 300, respectively. The influent to the bioreactor is directed to the zones without oxygen (i.e., anaerobic or anoxic) 202, 302, and generally, but not always, enters said reactor above the water line 201. Once in the reactor, the influent enters the contact chamber 203, 303 where it blends with a recycled liquor that contains high nitrate and solids concentrations being discharged from the outlet of the internal recycle 206, 306, creating mixed liquor. Said mixed liquor exits said contact chamber and enters the anoxic/anaerobic reaction zone 204, 304, where mixers 205, 305 provide additional blending. In the case of this embodiment, the said mixers are driven by air and there is an air supply line 209 and solenoid valve 309 to control said mixers.

Said anoxic/anaerobic zone is generally situated adjacent to the aerobic reaction zone 210, 310 with a partition separating the two said reaction zones 208, 308. Said mixed liquor exits said anoxic/anaerobic zone through the anoxic/anaerobic discharge port. 207, 307 and enters said aerobic zone. Aerobic conditions can be maintained in said aerobic zone by the use and function of fine bubble diffusers 211, 311, although other means are possible, and mixed liquor undergoes several chemical and biological reactions in said aerobic zone before being conveyed out of said aerobic zone.

Eventually said mixed liquor reaches a partition 214, 314 that separates said aerobic zone from a static zone 228, 328 that has the function of maintaining quiescent conditions so that liquid separates from solids via gravitational settling; allowing supernatant to discharge through the outlet 227, 327 as effluent while said solids gravitate towards the bottom of the reactor. It should be noted that any floatable materials in said static zone are collected by, and conveyed through, a scum removal device 225, 325.

Said mixed liquor in said aerobic zone will enter a mechanism providing flow from said aerobic zone to said static zone 216, 316 through the inlet 218 of said mechanism. Flow of said mixed liquor into said mechanism may, but not necessarily always, be induced via air lift where an air supply for said mechanism 219, 319 provides said air to an air supply manifold 315 that releases said air into said mechanism. Said air and said mixed liquor travel in said mechanism and through said partition. Said air is discharged from said mechanism at the air release point 220, 320 while said mixed liquor is discharged to said static zone via the outlet of said mechanism 222.

Said mixed liquor is discharge in a downward direction towards an opening in the partition that separates the aerobic zone form the static zone 224, and flow may be directed toward said opening by said outlet of said mechanism and/or a sloped floor 226 in said static zone. Once in said static zone the aforementioned solids/liquid separation phase occurs, and said mixed liquor has been concentrated and is now considered sludge. Said sludge is returned through said opening(s) in said partition by flow induced by said mechanism that transports mixed liquor from said aerobic zone to said static zone. Said flow also helps to scour said sloped floor. This function, and the speed and efficiency of sludge return greatly contribute to the effectiveness of the embodiment and the operational and treatment process therein. Occasional wasting of sludge may be a necessary function of operation, but can be accomplished by any number of methods without the use of a specific device or means.

A significant portion of said sludge, once returned through said partition, re-enters said mechanism providing flow from said aerobic zone to said static zone. This recirculation effect is highly effective at producing sludge with excellent settling characteristics and significantly contributes to the effectiveness of the treatment system. Said sludge that is not taken up into said mechanism, or dispersed back into said aerobic zone, enters the intake port of the recycle line 212 along with nitrified liquor from said aerobic zone. Said recycle flow may be, but not necessarily, conveyed via airlift and, as such, an air supply 217, 317 may be required to provide air. Said recycle liquid and air are conveyed together until the air is evacuated through the air release point of said recycle mechanism 213, 313. Said scum removal device located in said static zone may discharge into said recycle mechanism at this point via the outlet of the scum removal device 323. Said recycle flow enters said contact chamber via said outlet.

The unique flow pattern of the first embodiment, and of the first embodiment when incorporated into a treatment process as described in the second embodiment, is illustrated in FIG. 400. The circulatory flow effect of the first embodiment has several beneficial aspects that affect the performance of the second embodiment. The short-circuiting effect of the return sludge into the forward flow of the system and back again aids in flocculation and performance of the static zone. Larger flocs of solids are recycled to the front of the process, as seen in the second embodiment, where they contribute to higher levels of biological performance. The shape and function of the first embodiment prevents accumulation of sludge on the floor of the static zone and eliminates the potential of floating sludge in this zone.

Advantages

As per the descriptions above, a number of advantages of the Bow Pump and Reactor for Wastewater Treatment become evident:

(a) The unique flow pattern produced by the Bow Pump inside the Bow Reactor immediately introduces and blends return sludge with mixed liquor to create superior flocculation and sludge settling characteristics that increases both the biological and physical performance of the reactor.

(b) The design of the Bow Pump in the Bow Reactor can be used to scour and convey solids from the settling zone to the reaction zone, eliminating solids build-up that results in floating sludge and poor effluent quality.

(c) The Bow Pump can operate completely on compressed air, which must be supplied to provide aerobic conditions to at least one reaction zone. As such, the Bow Pump offers minimal additional cost; both in terms of capital and operational expenditures.

CONCLUSION, RAMIFICATIONS, AND SCOPE

Thus the reader will see that at least one embodiment of the treatment device offers an improvement over the more traditional means of conveying water between reaction and settling zones in a wastewater or water treatment reactor. Using air-based conveyance decreases electrical costs associated with operation, as well as ongoing maintenance associated with mechanical pumps. Immediately returning solids from the separating zone to the reaction zone increases the overall effectiveness and efficiency of the reactor by maintaining as much biomass or chemical reactants in the reaction zone as possible. The unique circulatory flow pattern that the device creates improves solids scouring of the bottom of the settling zone that prevents biologically active solids from going anaerobic, forming gas bubbles, and floating to the zone's surface where they may contaminate the effluent. Lastly, the blending and recirculation of sludge from the settling zone with mixed liquor creates a highly flocculated sludge with biological and physical (i.e., settling) characteristics that are superior to other activated sludge processes.

While the above description contains many specificities, these should not be construed as limitations on the scope, but rather as an exemplification of one (or several) embodiment(s) thereof. Many other variations are possible. For example, the fluid conveyance device may extend the entire length of the partition, or there may be several conveyance devices located along a single partition. Another example is using more than one uptake orifice on the uptake side of the device.

Accordingly, the scope should be determined not by the embodiment(s) illustrated, but by the appended claims and their legal equivalents.

What is claimed is:

1. A water treatment apparatus comprising:

A vessel having a vessel inlet through which influent wastewater can be received and a vessel outlet through which treated effluent can be removed from the vessel, whereby flow through the vessel from the inlet to the outlet defines flow in the forward or downstream direction;

an upstream treatment zone;

a downstream solids settling zone;

a generally vertical partition separating the treatment zone from the solids settling zone, the partition having a partition opening at the bottom end thereof through which wastewater solids and liquids may pass in the reverse direction; and a fluid conveyance device having a generally vertical conduit with at least one uptake orifice positioned in the treatment zone near the partition opening and at least one discharge orifice in the settling zone whereby the fluid conveyance device is capable of drawing a return flow of liquid and solids in the reverse direction from the bottom of the settling zone through the partition opening to the bottom of the treatment zone and conveying the returned liquid and solids through the uptake orifice to the discharge orifice where the return flow is a significant portion of forward flow through the fluid conveyance device.

2. The water treatment apparatus of claim 1 wherein said fluid conveyance device is composed of metal.

3. The water treatment apparatus of claim 1 wherein said fluid conveyance device is composed of a petroleum-based product.

4. The water treatment apparatus of claim 1 wherein said fluid conveyance device is composed of a ceramic material.

5. The water treatment apparatus of claim 1 wherein said uptake orifice(s) consists of a converging flow design.

6. The water treatment apparatus of claim 1 wherein said discharge orifice(s) consists of a diverging flow design.

7. The water treatment apparatus of claim 1 wherein the fluid conveyance device comprises an air injector at an air injection point.

8. The water treatment apparatus of claim 7 wherein said air injection point is located below said uptake orifice.

9. The water treatment apparatus of claim 7 wherein said air injection point is within said conduit of the fluid conveyance device.

10. The water treatment apparatus of claim 1 wherein the fluid conveyance device comprises a mechanical fluid pump to convey fluid through said fluid conveyance device.

11. The water treatment apparatus of claim 1 wherein the treatment zone effects biological and/or chemical reaction treatment and the solids settling zone effects solid/liquid separation.

12. The water treatment apparatus of claim 1 wherein said discharge orifice is aligned to scour settled material in said solids settling zone.

13. The water treatment apparatus of claim 1 further comprising means to covey fluid to one or more zones from either or both said treatment and/or said solids settling zone.

14. The water treatment apparatus of claim 1 wherein fluid discharge from said discharge orifice is redirected once leaving said discharge orifice in a way that directs said fluid discharge toward said opening in said partition.

15. The water treatment apparatus of claim 1 wherein said fluid conveyance device intersects the entire length of said partition.

16. The water treatment apparatus of claim 15 wherein a portion of said fluid conveyance device incorporates a means to convey flow to one or more zones other than said solids settling zone.

17. The water treatment apparatus of claim 1 wherein one or more said fluid conveyance device(s) intersect said partition.

18. The water treatment apparatus of claim 17 further comprising means to convey flow to one or more zones other than said solids settling zone.

19. The water treatment apparatus of claim 1 wherein the vessel is a basin or reactor used for the treatment or reclamation of water or wastewater.

20. A wastewater treatment method comprising:
Feeding contaminated wastewater influent to a wastewater treatment vessel through a vessel inlet;
Removing treated wastewater effluent from the wastewater treatment vessel through a vessel outlet, whereby the direction from the inlet to the outlet defines flow in the forward or downstream direction;
Treating the wastewater in an upstream treatment zone of the vessel;
Settling solids in a downstream solids settling zone of the vessel;
Passing liquid and liquid-entrained solids at a return flowrate from the bottom of the downstream solids settling zone in the reverse or upstream direction into the bottom of the upstream treatment zone through an opening in a generally vertical partition separating the treatment zone from the solids settling zone; and
Conveying in the forward direction liquid and at least some of said liquid-entrained solids through a generally vertical conduit from at least one conduit uptake orifice positioned in the upstream treatment zone near the partition opening to at least one conduit discharge orifice in the settling zone at a conveyed forward flowrate, such that the return flowrate is a significant portion of the conveyed forward flowrate.

21. The method of claim 20 wherein the flow of the liquid and liquid-entrained solids converges as it flows through the at least one conduit uptake orifice.

22. The method of claim 20 wherein the flow of the liquid and liquid-entrained solids diverges as it flows through the at least one conduit discharge orifice.

23. The method of claim 20 further comprising introducing air into the conduit to effect conveyance of the liquid and liquid-entrained solids through the conduit.

24. The method of claim 23 wherein the air is introduced to the vessel at a point below the uptake orifice.

25. The method of claim 23 wherein the air is introduced within the conduit.

26. The method of claim 20 wherein the conveying is effected by a mechanical fluid pump.

27. The method of claim 20 wherein biological and/or chemical reactions take place in the treatment zone.

28. The method of claim 20 wherein settled solids in the solids settling zone are scoured.

29. The method of claim 20 wherein liquid and settled solids are conveyed to one or more zones from either or both the treatment zone and/or the solids settling zone.

30. The method of claim 20 further comprising directing fluid from the discharge orifice toward the partition opening.

31. The method of claim 20 further comprising conveying a portion of the conveyed fluid to one or more zones other than the solids settling zone.

* * * * *